United States Patent
Wang et al.

(10) Patent No.: US 10,197,474 B2
(45) Date of Patent: Feb. 5, 2019

(54) SYSTEM AND METHODS OF INSPECTING A COMPONENT

(71) Applicant: General Electric Company, Schenectady, NY (US)

(72) Inventors: Anquan Wang, Mason, OH (US); Guanghua Wang, Clifton Park, NY (US); James Peter DeLancey, Corinth, NY (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 15/586,734

(22) Filed: May 4, 2017

(65) Prior Publication Data

US 2018/0321113 A1 Nov. 8, 2018

(51) Int. Cl.
| | | |
|---|---|---|
| *G01M 15/14* | (2006.01) | |
| *F01D 21/00* | (2006.01) | |
| *F01D 5/18* | (2006.01) | |
| *F01D 9/02* | (2006.01) | |
| *F23R 3/00* | (2006.01) | |

(52) U.S. Cl.
CPC .......... *G01M 15/14* (2013.01); *F01D 21/003* (2013.01); *F01D 5/186* (2013.01); *F01D 9/02* (2013.01); *F05D 2220/32* (2013.01); *F05D 2260/202* (2013.01); *F05D 2260/83* (2013.01); *F23R 3/002* (2013.01)

(58) Field of Classification Search
CPC ........ G01M 15/14; F01D 21/003; F01D 9/02; F01D 5/186; F05D 2260/83; F05D 2260/202; F05D 2220/32; F23R 3/002
See application file for complete search history.

(56) References Cited

U.S. PATENT DOCUMENTS

| | | | |
|---|---|---|---|
| 4,002,060 A | 1/1977 | Ogata et al. | |
| 5,186,046 A | 2/1993 | Gouterman et al. | |
| 5,307,675 A | 5/1994 | Mosharov et al. | |
| 5,598,990 A | 2/1997 | Farokhi et al. | |
| 5,612,492 A | 3/1997 | Schwab et al. | |
| 8,215,159 B2 * | 7/2012 | Kell | F01D 5/186 |
| | | | 73/112.01 |
| 8,244,488 B2 | 8/2012 | Allen et al. | |
| 8,768,646 B2 | 7/2014 | Key | |

(Continued)

*Primary Examiner* — Freddie Kirkland, III
(74) *Attorney, Agent, or Firm* — General Electric Company; Pamela Kachur

(57) ABSTRACT

A system for use in inspecting a component having flow openings defined therein. The system includes a fluid injector in flow communication with the component, wherein the fluid injector provides fluid to the component such that the fluid is discharged from the flow openings. A sensing sheet is coupled to or positioned proximate to the component such that the fluid discharged from the flow openings is received at the sensing sheet, wherein the sensing sheet is formed from pressure-sensitive material. A light source emits light towards the sensing sheet such that the pressure-sensitive material is excited to an energy level. The system further includes an imaging device that captures images of a change in color of the pressure-sensitive material as a function of a pressure of the fluid received at the sensing sheet, wherein the change in color represents a pressure distribution across the sensing sheet based on a flow profile of the fluid discharged from the flow openings.

20 Claims, 5 Drawing Sheets

(56) References Cited

U.S. PATENT DOCUMENTS

| | | |
|---|---|---|
| 8,777,567 B2 | 7/2014 | Poon et al. |
| 8,866,084 B2 | 10/2014 | Baleine et al. |
| 9,182,318 B2 | 11/2015 | McCaldon |
| 9,250,188 B2 * | 2/2016 | Tallman ................ G01N 21/84 |
| 9,274,009 B2 * | 3/2016 | Key ........................ G01J 5/00 |
| 9,383,197 B2 * | 7/2016 | Meschter ............... G01B 15/02 |

* cited by examiner

SYSTEM AND METHODS OF INSPECTING A COMPONENT

BACKGROUND

The present disclosure relates generally to inspecting a component for hole blockages and, more specifically, to inspecting a component using pressure-sensitive material to determine its film cooling efficiency.

In a gas turbine engine, air pressurized in a compressor is mixed with fuel in a combustor to generate hot combustion gases. Energy is initially extracted from the gases in a high pressure turbine (HPT) that powers the compressor, and subsequently in a low pressure turbine (LPT) that powers a fan in a turbofan aircraft engine application, or powers an external shaft for marine and/or industrial applications. Generally, engine efficiency increases as the temperature of combustion gases is increased. However, the increased gas temperature increases the operating temperature of various components along the gas flowpath, which in turn increases the need for cooling such components to facilitate extending their useful life.

For example, at least some known gas turbine components, such as blades, nozzles, and liners, require cooling during operation of the gas turbine engine. In at least some gas turbine engines, flowpath components exposed to hot combustion gases are cooled using compressor bleed air. For example, at least some known components channel the compressor bleed air through film cooling holes defined within the gas turbine components. Film cooling holes are typically formed by machining elongated passageways within the component, which is a time-consuming and complicated task, such that the holes are sometimes improperly formed, thereby reducing their film cooling efficiency. Film cooling holes may also occasionally become blocked during operation of the gas turbine engine, such as by particles entrained in the compressor bleed air. One known method of inspecting a component for film cooling blockages is to coat the component with pressure-sensitive paint, which is sensitive to local variations in the pressure of oxygen such that a flow distribution of cooling fluid discharged from the film cooling holes may be determined. However, coating a component with pressure-sensitive paint, which includes applying the paint to the component and curing the component at elevated temperatures, can be a time-consuming and laborious task.

BRIEF DESCRIPTION

In one aspect, a method of inspecting a component having a plurality of flow openings defined therein is provided. The method includes coupling a sensing sheet to the component, wherein the sensing sheet is formed at least partially from a pressure-sensitive material, emitting light towards the sensing sheet such that the pressure-sensitive material is excited to an energy level, and injecting fluid into the component such that the fluid is discharged from the plurality of flow openings and flows across the sensing sheet. The method further includes determining a pressure distribution across the sensing sheet based on a flow profile of the fluid discharged from the plurality of flow openings. The pressure-sensitive material is configured to change color as a function of a pressure of the fluid that flows across the sensing sheet.

In one embodiment, which may include at least a portion of the subject matter of any of the preceding and/or following examples and aspects, injecting fluid into the component includes injecting a foreign gas into the component, wherein the foreign gas includes at least one of carbon dioxide or nitrogen.

In one embodiment, which may include at least a portion of the subject matter of any of the preceding and/or following examples and aspects, determining a pressure distribution includes determining a color change in the pressure-sensitive material based on a pressure of oxygen at the sensing sheet, wherein the fluid discharged from the plurality of flow openings at least partially restricts exposure of the sensing sheet to the oxygen.

In one embodiment, which may include at least a portion of the subject matter of any of the preceding and/or following examples and aspects, coupling a sensing sheet further includes adhesively coupling the sensing sheet to the component.

In one embodiment, which may include at least a portion of the subject matter of any of the preceding and/or following examples and aspects, the sensing sheet includes a plurality of apertures defined therein arranged in a predetermined pattern corresponding to a location of the plurality of flow openings on the component, wherein coupling a sensing sheet to the component includes aligning the plurality of apertures in the sensing sheet with the plurality of flow openings.

In one embodiment, which may include at least a portion of the subject matter of any of the preceding and/or following examples and aspects, the plurality of flow openings includes a first flow opening and a second flow opening that is positioned adjacent to and downstream from the first flow opening, wherein coupling a sensing sheet includes coupling the sensing sheet at a location on the component downstream from the first flow opening and upstream from the second flow opening.

In one embodiment, which may include at least a portion of the subject matter of any of the preceding and/or following examples and aspects, the plurality of flow openings includes a first flow opening and a third flow opening, wherein coupling a sensing sheet includes orienting the sensing sheet such that fluid discharged from the first flow opening flows across a first portion of the sensing sheet, and such that fluid discharged from the second flow opening flows across a second portion of the sensing sheet.

In one embodiment, which may include at least a portion of the subject matter of any of the preceding and/or following examples and aspects, the plurality of flow openings are arranged in at least a first row and a second row, wherein coupling a sensing sheet includes coupling a first sensing sheet and a second sensing sheet to the component, the first sensing sheet positioned to receive fluid discharged from flow openings in the first row, and the second sensing sheet positioned to receive fluid discharged from flow openings in the second row.

In another aspect, a system for use in inspecting a component having a plurality of flow openings defined therein is provided. The system includes a fluid injector in flow communication with the component, wherein the fluid injector is configured to provide fluid to the component such that the fluid is discharged from the plurality of flow openings. A sensing sheet is at least one of coupled to or positioned proximate to the component such that the fluid discharged from the plurality of flow openings is received at the sensing sheet, wherein the sensing sheet is formed at least partially from a pressure-sensitive material. A light source is configured to emit light towards the sensing sheet such that the pressure-sensitive material is excited to an energy level. The system further includes an imaging device configured to capture images of a change in color of the pressure-sensitive material as a function of a pressure of the fluid received at the sensing sheet, wherein the change in color represents a pressure distribution across the sensing sheet based on a flow profile of the fluid discharged from the plurality of flow openings.

In one embodiment, which may include at least a portion of the subject matter of any of the preceding and/or following examples and aspects, the fluid injector is configured to provide foreign gas to the component, wherein the foreign gas includes at least one of carbon dioxide or nitrogen.

In one embodiment, which may include at least a portion of the subject matter of any of the preceding and/or following examples and aspects, the sensing sheet includes a layer of adhesive material, wherein the sensing sheet is coupled to the component with the adhesive material.

In one embodiment, which may include at least a portion of the subject matter of any of the preceding and/or following examples and aspects, the system further includes a tool, wherein the sensing sheet is coupled to the tool, and wherein the tool is configured to position the sensing sheet proximate to the component.

In one embodiment, which may include at least a portion of the subject matter of any of the preceding and/or following examples and aspects, the sensing sheet includes a plurality of apertures defined therein arranged in a predetermined pattern.

In one embodiment, which may include at least a portion of the subject matter of any of the preceding and/or following examples and aspects, the pressure-sensitive material is configured to change color based on a pressure of oxygen at the sensing sheet, wherein the fluid discharged from the plurality of flow openings at least partially restricts exposure of the sensing sheet to the oxygen.

In yet another aspect, a method of inspecting a component having a plurality of flow openings defined therein is provided. The method includes positioning a tool proximate the component, wherein the tool has a sensing sheet coupled thereto, the sensing sheet formed at least partially from a pressure-sensitive material, emitting light towards the sensing sheet such that the pressure-sensitive material is excited to an energy level, providing fluid to the component such that the fluid is discharged from the plurality of flow openings and towards the sensing sheet, and determining a pressure distribution across the sensing sheet based on a flow profile of the fluid discharged from the plurality of flow openings, wherein the pressure-sensitive material is configured to change color as a function of a pressure of the fluid that flows across the sensing sheet.

In one embodiment, which may include at least a portion of the subject matter of any of the preceding and/or following examples and aspects, providing fluid to the component includes providing a foreign gas to the component, wherein the foreign gas includes at least one of carbon dioxide or nitrogen.

In one embodiment, which may include at least a portion of the subject matter of any of the preceding and/or following examples and aspects, determining a pressure distribution includes determining a color change in the pressure-sensitive material based on a pressure of oxygen at the sensing sheet, wherein the fluid discharged from the plurality of flow openings at least partially restricts exposure of the sensing sheet to the oxygen.

In one embodiment, which may include at least a portion of the subject matter of any of the preceding and/or following examples and aspects, the method further includes adhesively coupling the sensing sheet to the tool.

In one embodiment, which may include at least a portion of the subject matter of any of the preceding and/or following examples and aspects, positioning a tool includes positioning the tool such that an area of the sensing sheet is spaced a substantially equal distance from a side wall of the component.

In one embodiment, which may include at least a portion of the subject matter of any of the preceding and/or following examples and aspects, the component includes a side wall oriented to define an interior configured to receive the fluid discharged from the plurality of flow openings, wherein positioning a tool includes inserting the tool within the interior of the component.

DRAWINGS

These and other features, aspects, and advantages of the present disclosure will become better understood when the following detailed description is read with reference to the accompanying drawings in which like characters represent like parts throughout the drawings, wherein.

Figure 1:
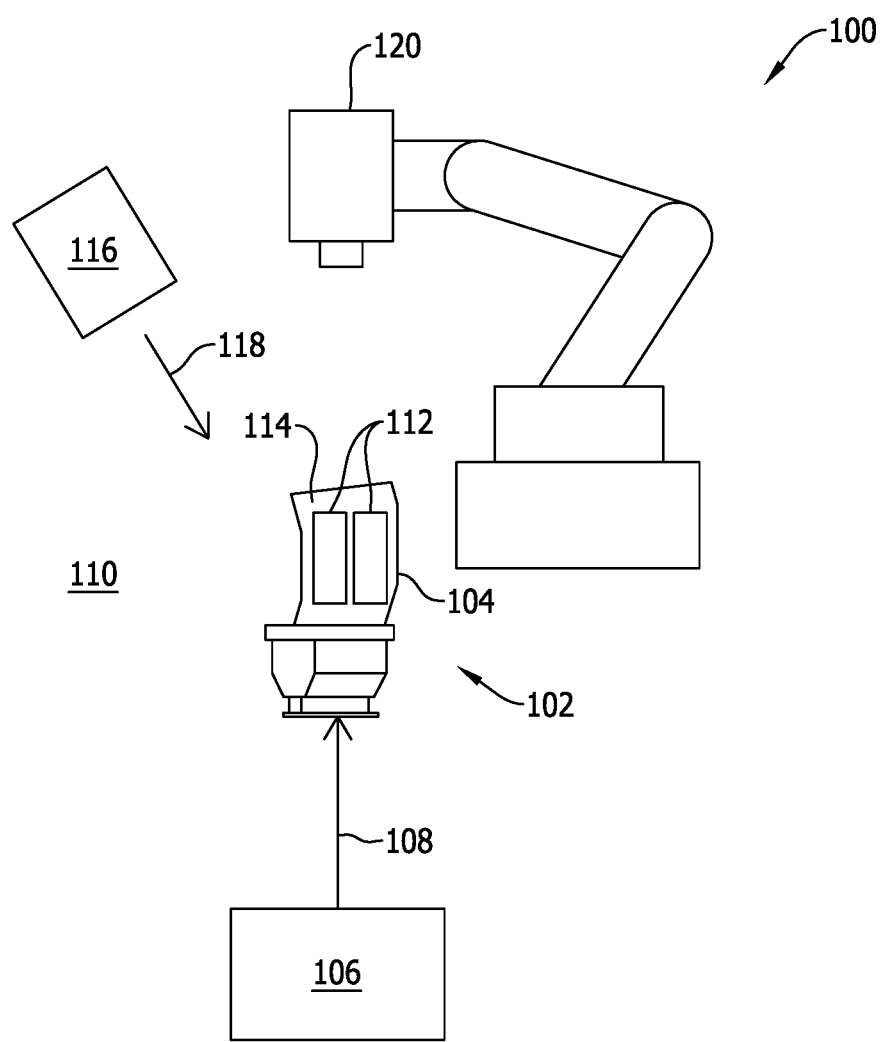
FIG. 1 is a schematic illustration of an exemplary system for use in inspecting a component.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged.

Such ranges are identified and include all the sub-ranges contained therein unless context or language indicates otherwise.

Embodiments of the present disclosure relate to inspecting a component using pressure-sensitive material to determine its film cooling efficiency. More specifically, the systems and methods described herein facilitate inspecting the component without having to apply and cure pressure-sensitive material onto each individual component that needs to be inspected. In contrast, the systems and methods described herein inspect components for hole blockages, or improperly formed holes, using an object already having the pressure-sensitive material applied to and cured thereon. For example, the object may be in the form of a sensing sheet formed at least partially from pressure-sensitive material. During inspection, luminescent particles in the pressure-sensitive material are energized, and color changes in the pressure-sensitive material are formed as a function of a pressure of fluid discharged from flow openings in the component. For example, the luminescence of the pressure-sensitive material is quenched in the presence of oxygen, and the fluid discharged from flow openings facilitates restricting exposure of the sensing sheet to oxygen. The change in color and luminescence of the pressure-sensitive material facilitates visualizing a flow profile of the fluid discharged from the flow openings. In addition, the adiabatic film effectiveness is determined based on a mass transfer analogy of the fluid discharged from the flow openings. As such, the absolute film cooling effectiveness of the component may be determined in an accelerated and simplified manner.

While the following embodiments are described in the context of components of a turbofan engine, it should be understood that the systems and methods described herein are also applicable to turboprop engines, turboshaft engines, turbojet engines, and ground-based turbine engines, for example.

FIG. 1 is a schematic illustration of an exemplary system 100 for use in inspecting a component 102. In the exemplary embodiment, component 102 includes a plurality of flow openings 132 (shown in FIG. 3) defined therein. As shown in FIG. 1, component 102 is an airfoil 104 for use in a turbine engine (not shown), for example. The plurality of flow openings 132 defined in component 102 facilitates providing film cooling for component 102 during operation of an associated turbine engine, for example. As noted above, the plurality of flow openings 132 may become blocked after prolonged operation of the turbine engine. As such, system 100 is operable to inspect component 102 for film performance of the plurality of flow openings 132 defined therein.

In the exemplary embodiment, system 100 includes a fluid injector 106 in flow communication with component 102. Fluid injector 106 provides fluid 108 to component 102 such that fluid 108 is discharged from the plurality of flow openings defined in component 102. As such, fluid injector 106 facilitates simulating film cooling of component 102, which is then used to determine the film performance of each of the flow openings defined therein. Fluid injector 106 may provide any fluid 108 to component 102 that enables system 100 to function as described herein. For example, fluid 108 is capable of restricting the exposure of component 102 to oxygen in an ambient environment 110, such that oxygen quenching of a pressure-sensitive material adhered thereto is likewise restricted across component 102. Example fluids include a foreign gas such as, but not limited to, carbon dioxide and nitrogen.

System 100 further includes at least one sensing sheet 112 at least one of coupled to or positioned proximate to component 102 such that the fluid discharged from the plurality of flow openings is received at sensing sheet 112. In the exemplary embodiment, sensing sheet 112 is coupled to an outer surface 114 of component 102, as will be explained in more detail below. Sensing sheet 112 is formed at least partially from a pressure-sensitive material, including an oxygen-sensitive molecule and an oxygen-permeable binder. In an alternative embodiment, sensing sheet 112 is formed at least partially from a temperature-sensitive material.

In operation, a light source 116 emits light 118 towards sensing sheet 112 such that the pressure-sensitive material is excited to a higher energy level. More specifically, the oxygen-sensitive molecules of the pressure-sensitive material absorb energy from light 118 and subsequently fluoresce. Fluid injector 106 then provides fluid 108 to component 102 such that fluid 108 is discharged from the plurality of flow openings in component 102. As noted above, fluid 108 facilitates restricting oxygen quenching of the pressure-sensitive material of sensing sheet 112 to facilitate defining a visible pressure distribution across sensing sheet 112. More specifically, the fluorescence of the pressure-sensitive material is reduced, and the color of the pressure-sensitive material changes from oxygen quenching as the partial pressure of oxygen present at sensing sheet 112 increases. An imaging device 120 then captures images of component 102 and, more specifically, of the change in color of the pressure-sensitive material in sensing sheet 112 as a function of a pressure of the fluid received at sensing sheet 112. The change in color of the pressure-sensitive material represents a pressure distribution across sensing sheet 112 based on a flow profile of the fluid discharged from the plurality of flow openings. As such, potential hole blockages in component 102 are determined based on the visual representation of the flow profile formed across sensing sheet 112.

Figure 2:
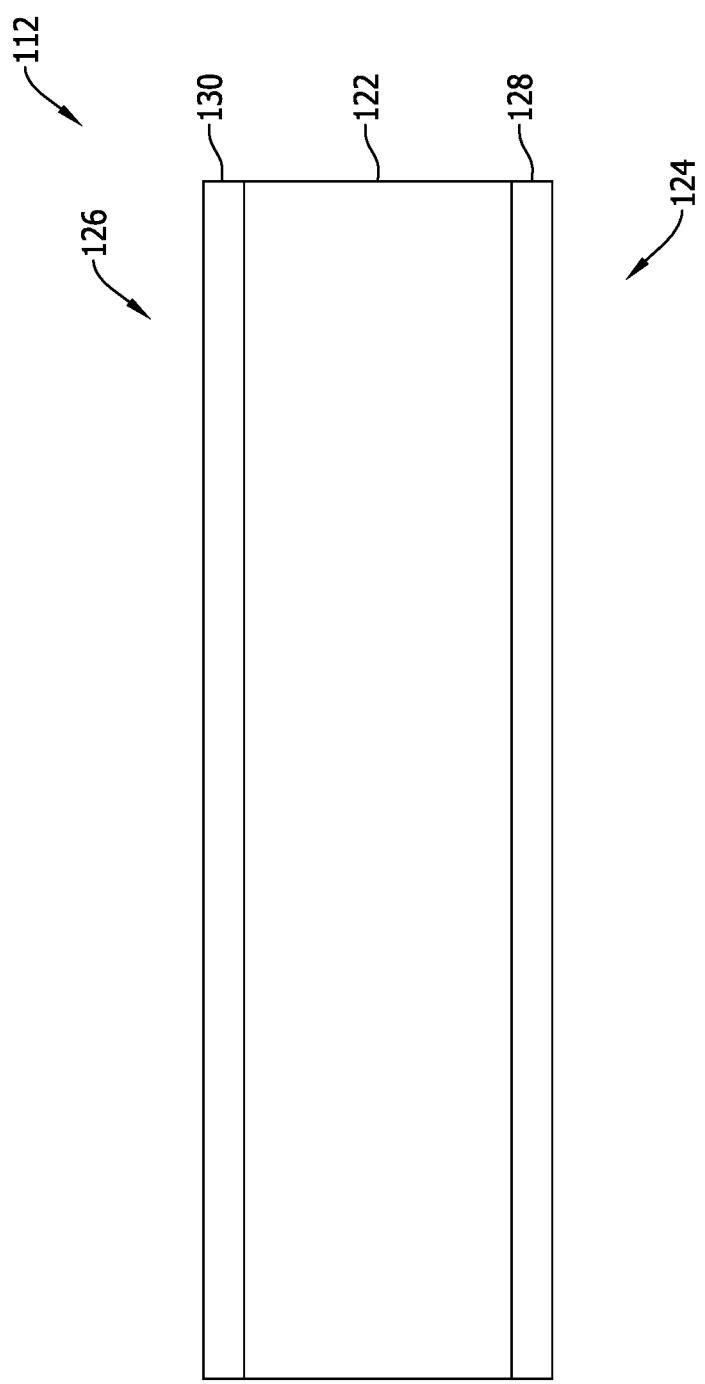
FIG. 2 is a cross-sectional illustration of an exemplary sensing sheet that may be used with the system shown in FIG. 1.

FIG. 2 is a cross-sectional illustration of an exemplary sensing sheet 112 that may be used with system 100 (shown in FIG. 1). In the exemplary embodiment, sensing sheet 112 includes a substrate 122 having a first side 124 and a second side 126. A layer 128 of adhesive material is formed on first side 124 of substrate 122, and a layer 130 of pressure-sensitive material is formed on second side 126 of substrate 122. More specifically, the pressure-sensitive material is applied to, and cured on, second side 126 of substrate 122 before coupling sensing sheet 112 to component 102 (shown in FIG. 1). As such, as will be explained in further detail below, sensing sheet 112 is formed independently of component 102 and subsequently coupleable to component 102 during inspection thereof using system 100. When coupled to component 102 using the adhesive material, sensing sheet 112 is oriented such that the pressure-sensitive material on second side 126 is exposed to ambient environment 110 (shown in FIG. 1). The adhesive material also enables sensing sheet 112 to be temporarily coupled to component 102, and then removed therefrom after the inspection has been completed. Sensing sheet 112 may then be used to inspect other components, for example.

Figure 3:
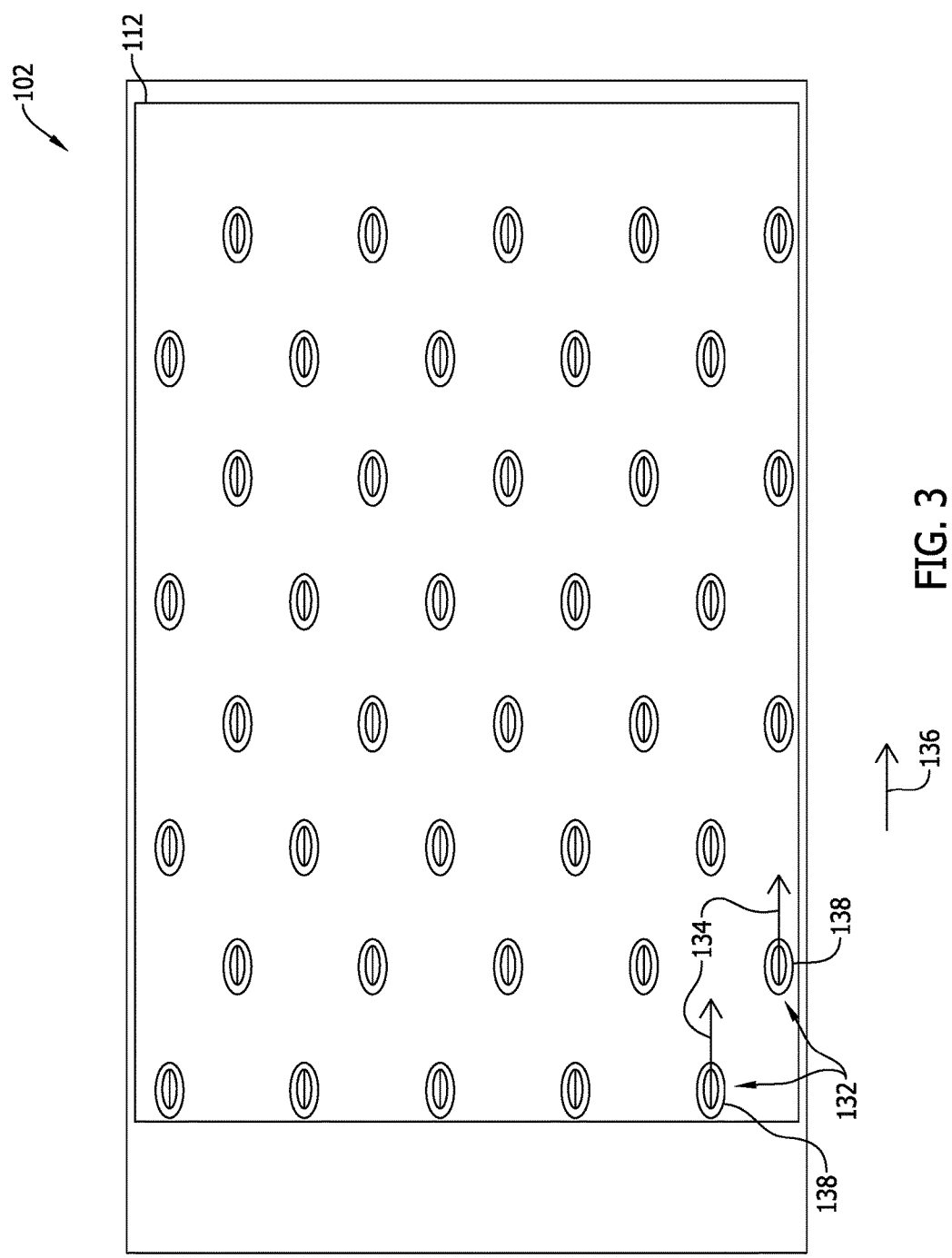
FIG. 3 is a schematic illustration of an exemplary sensing sheet that may be used when inspecting the component shown in FIG. 1.
Figure 4:
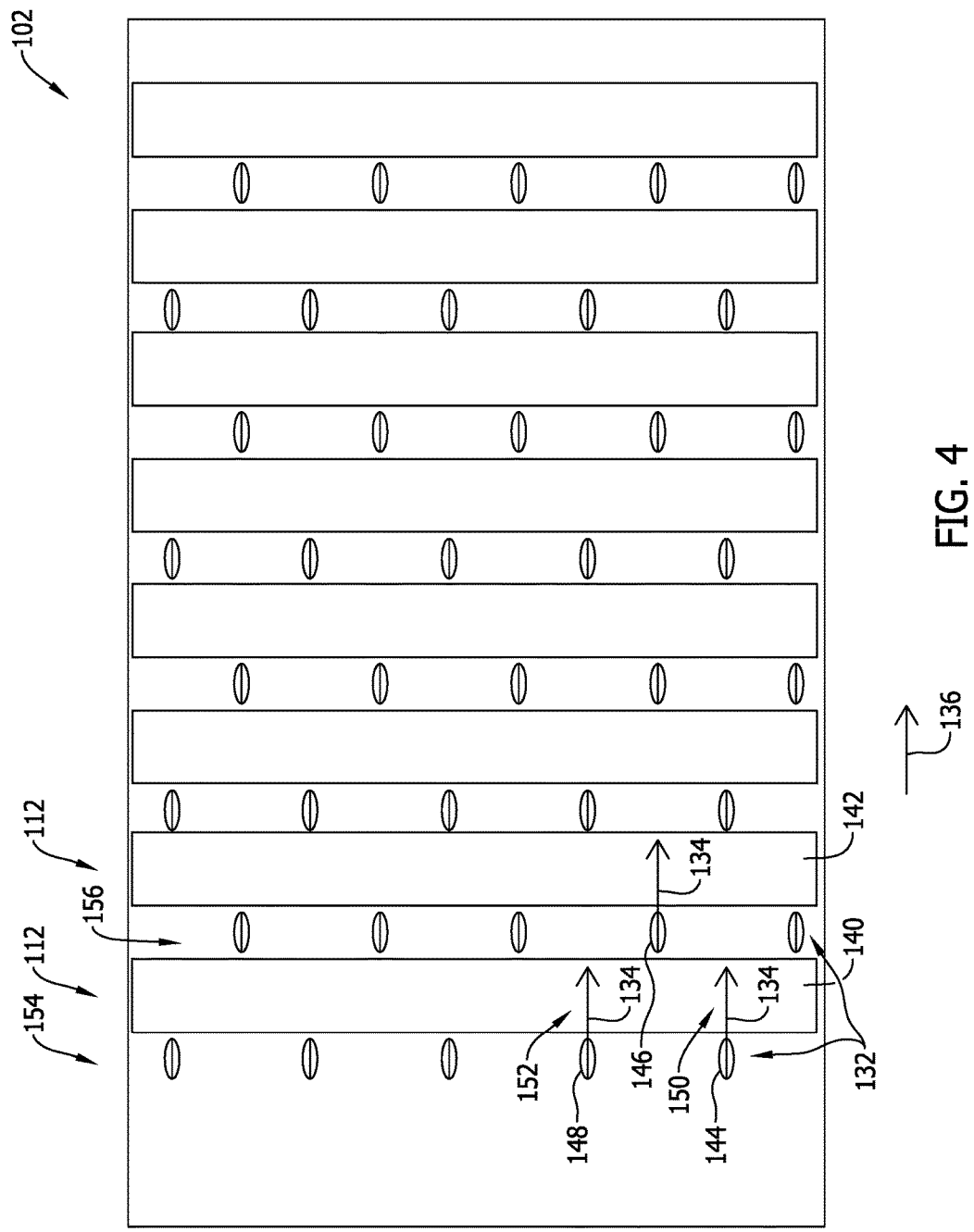
FIG. 4 is a schematic illustration of an exemplary plurality of sensing sheets that may be used when inspecting the component shown in FIG. 1.

FIG. 3 is a schematic illustration of sensing sheet 112 that may be used when inspecting component 102, and FIG. 4 is a schematic illustration of an exemplary plurality of sensing sheets 112 that may be used when inspecting component 102. In the exemplary embodiment, component 102 includes a plurality of flow openings 132 defined therein. The plurality of flow openings 132 are arranged in a predetermined pattern across component 102, and discharge a plurality of fluid streams 134 therefrom in a downstream direction 136 across component 102. The plurality of flow openings 132 are arranged such that the plurality of fluid streams 134 facilitates providing film cooling across component 102.

Referring to FIG. 3, sensing sheet 112 includes a plurality of apertures 138 defined therein. The plurality of apertures 138 are arranged in a predetermined pattern such that a location of apertures 138 corresponds to a location of the plurality of flow openings 132 on component 102. In the exemplary embodiment, sensing sheet 112 is coupled to component 102 such that the plurality of apertures 138 in sensing sheet 112 aligns with the plurality of flow openings 132. As such, sensing sheet 112 is perforated to allow fluid streams 134 discharged from flow openings 132 to flow across sensing sheet 112. In addition, in one embodiment, the plurality of apertures 138 are pre-formed in sensing sheet 112 before sensing sheet 112 is coupled to component 102. More specifically, the location of the plurality of flow openings 132 on component 102 is predetermined and stored electronically in the form of a schematic, for example. Sensing sheet 112 is then fabricated based on the schematic such that the plurality of apertures 138 align with the plurality of flow openings 132 at the predetermined locations when sensing sheet 112 is coupled to component 102. As such, pre-forming apertures 138 in sensing sheet 112 enables sensing sheet 112 to be coupled to component 102 in a quick and simple manner, especially when flow openings 132 are densely packed on component 102 or arranged in a complex and non-uniform pattern.

Referring to FIG. 4, a plurality of sensing sheets 112 in the form of elongated strips are coupled to component 102. The plurality of sensing sheets 112 includes at least a first sensing sheet 140 and a second sensing sheet 142 coupled to component 102. In addition, the plurality of flow openings 132 includes a first flow opening 144 and a second flow opening 146 that is positioned adjacent to and downstream from first flow opening 144. In the exemplary embodiment, first sensing sheet 140 is coupled at a location on component 102 downstream from first flow opening 144 and upstream from second flow opening 146. Moreover, the plurality of flow openings 132 includes a third flow opening 148 positioned adjacent to and neither upstream or downstream from first flow opening 144. In the exemplary embodiment, first sensing sheet 140 is oriented to extend transversely relative to downstream direction 136 such that fluid stream 134 discharged from first flow opening 144 flows across a first portion 150 of first sensing sheet 140, and such that fluid stream 134 discharged from third flow opening 148 flows across a second portion 152 of first sensing sheet 140 that is spaced from first portion 150. As such, a flow profile of fluid discharged from each individual flow opening 132 may be determined.

In some embodiments, the plurality of flow openings 132 are further arranged in at least a first row 154 and a second row 156. In addition, first sensing sheet 140 is positioned to receive fluid discharged from flow openings 132 in first row 154, and second sensing sheet 142 is positioned to receive fluid discharged from flow openings 132 in second row 156. As noted above, first sensing sheet 140 and second sensing sheet 142 are in the form of elongated strips of material. The plurality of sensing sheets 112 are arranged and oriented to facilitate determining a flow profile for each individual flow opening 132 without having to couple an individual sensing sheet downstream from each flow opening. As such, the amount of time and complexity of preparing component 102 for inspection with system 100 (shown in FIG. 1) is reduced.

Figure 5:
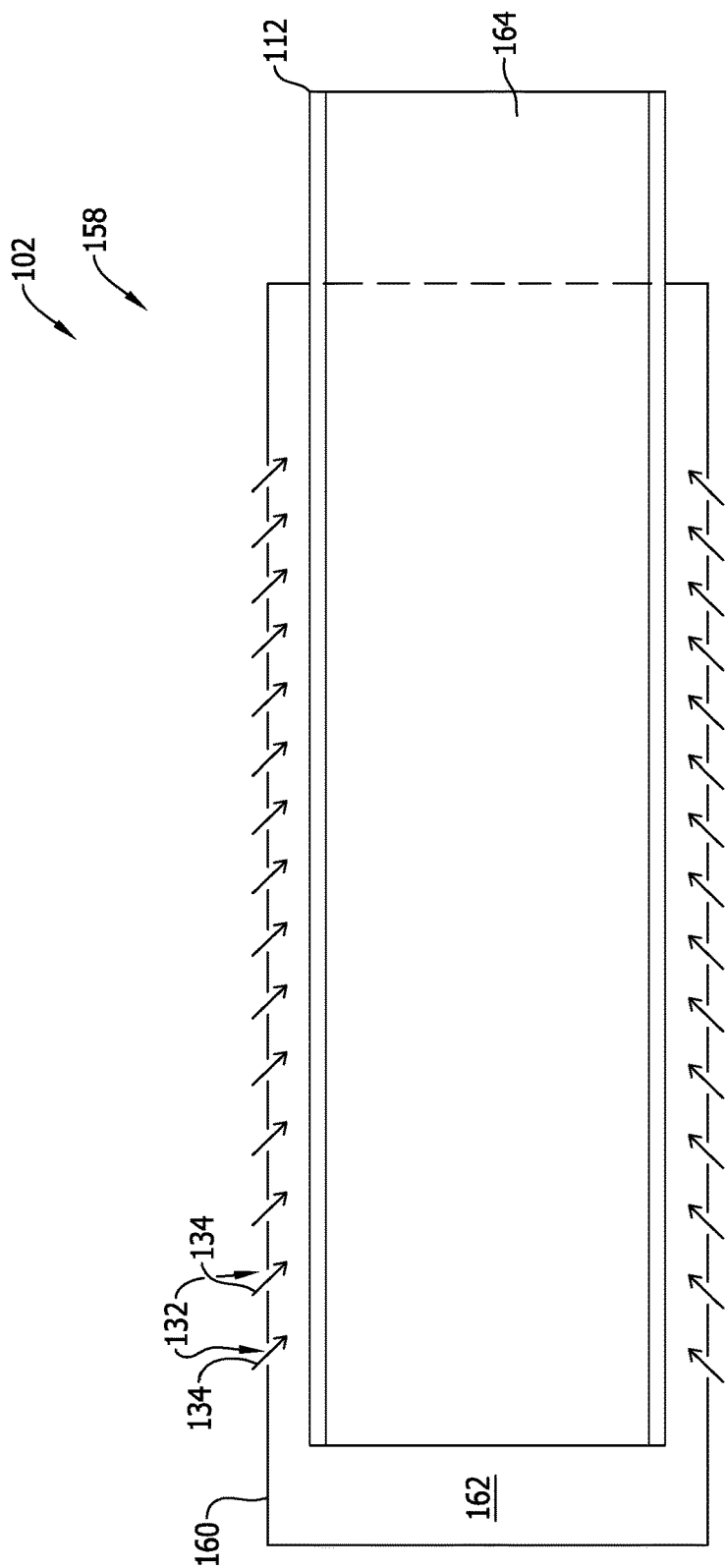
FIG. 5 is a cross-sectional illustration of an alternative component that may be inspected by the system shown in FIG. 1 with an exemplary tool.

FIG. 5 is a cross-sectional illustration of an alternative component 102 that may be inspected by system 100 (shown in FIG. 1). As shown in FIG. 5, component 102 is combustion liner 158 for use in a turbine engine, for example. In the exemplary embodiment, combustion liner 158 includes a side wall 160 having a plurality of flow openings 132 defined therein. Side wall 160 is oriented to define an interior 162 (i.e., a combustion chamber) of combustion liner 158. The plurality of flow openings 132 defined in component 102 facilitates providing film cooling for component 102 during operation of the turbine engine.

In the exemplary embodiment, system 100 further includes a tool 164 having sensing sheet 112 adhesively coupled thereto. During inspection of component 102, tool 164 is positioned proximate to component 102 such that fluid streams 134 discharged from flow openings 132 are received at sensing sheet 112. More specifically, side wall 160 is oriented such that interior 162 receives the fluid discharged from flow openings 132, and tool 164 is sized for insertion within interior 162 of component 102 such that sensing sheet 112 is positioned to receive the fluid. Tool 164 is also positioned such that sensing sheet 112 is spaced a substantially equal distance from side wall 160 of component 102. In some embodiments, tool 164 is shaped to substantially match the contours of component 102. As such, an accurate and evenly distributed visual representation of the flow profile formed across sensing sheet 112 is provided.

An exemplary technical effect of the system and methods described herein includes at least one of: (a) detecting potential hole blockages in a component having flow openings defined therein; (b) providing a visual representation of a flow profile for fluid discharged from the flow openings; and (c) reducing the complexity and amount of time for inspecting the component.

Exemplary embodiments of an inspection system and related methods are described above in detail. The system and methods are not limited to the specific embodiments described herein, but rather, components of systems and/or steps of the methods may be utilized independently and separately from other components and/or steps described herein. For example, the configuration of components described herein may also be used in combination with other processes, and is not limited to practice with inspecting components of a turbine engine. Rather, the exemplary embodiments can be implemented and utilized in connection with many applications where detecting hole blockages in a component is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of inspecting a component having a plurality of flow openings defined therein, said method comprising:
    coupling a sensing sheet to the component, wherein the sensing sheet is formed at least partially from a pressure-sensitive material;
    emitting light towards the sensing sheet such that the pressure-sensitive material is excited to an energy level;
    injecting fluid into the component such that the fluid is discharged from the plurality of flow openings and flows across the sensing sheet; and
    determining a pressure distribution across the sensing sheet based on a flow profile of the fluid discharged from the plurality of flow openings, wherein the pressure-sensitive material is configured to change color as a function of a pressure of the fluid that flows across the sensing sheet.

2. The method in accordance with claim 1, wherein injecting fluid into the component comprises injecting a foreign gas into the component, wherein the foreign gas includes at least one of carbon dioxide or nitrogen.

3. The method in accordance with claim 2, wherein determining a pressure distribution comprises determining a color change in the pressure-sensitive material based on a pressure of oxygen at the sensing sheet, wherein the fluid discharged from the plurality of flow openings at least partially restricts exposure of the sensing sheet to the oxygen.

4. The method in accordance with claim 1, wherein coupling a sensing sheet further comprises adhesively coupling the sensing sheet to the component.

5. The method in accordance with claim 1, wherein the sensing sheet includes a plurality of apertures defined therein arranged in a predetermined pattern corresponding to a location of the plurality of flow openings on the component, wherein coupling a sensing sheet to the component comprises aligning the plurality of apertures in the sensing sheet with the plurality of flow openings.

6. The method in accordance with claim 1, wherein the plurality of flow openings includes a first flow opening and a second flow opening that is positioned adjacent to and downstream from the first flow opening, wherein coupling a sensing sheet comprises coupling the sensing sheet at a location on the component downstream from the first flow opening and upstream from the second flow opening.

7. The method in accordance with claim 1, wherein the plurality of flow openings includes a first flow opening and a third flow opening, wherein coupling a sensing sheet comprises orienting the sensing sheet such that fluid discharged from the first flow opening flows across a first portion of the sensing sheet, and such that fluid discharged from the third flow opening flows across a second portion of the sensing sheet.

8. The method in accordance with claim 1, wherein the plurality of flow openings are arranged in at least a first row and a second row, wherein coupling a sensing sheet comprises coupling a first sensing sheet and a second sensing sheet to the component, the first sensing sheet positioned to receive fluid discharged from flow openings in the first row, and the second sensing sheet positioned to receive fluid discharged from flow openings in the second row.

9. A system for use in inspecting a component having a plurality of flow openings defined therein, said system comprising:
    a fluid injector in flow communication with the component, wherein the fluid injector is configured to provide fluid to the component such that the fluid is discharged from the plurality of flow openings;
    a sensing sheet at least one of coupled to or positioned proximate to the component such that the fluid discharged from the plurality of flow openings is received at said sensing sheet, wherein said sensing sheet is formed at least partially from a pressure-sensitive material;
    a light source configured to emit light towards said sensing sheet such that the pressure-sensitive material is excited to an energy level; and
    an imaging device configured to capture images of a change in color of the pressure-sensitive material as a function of a pressure of the fluid received at said sensing sheet, wherein the change in color represents a pressure distribution across the sensing sheet based on a flow profile of the fluid discharged from the plurality of flow openings.

10. The system in accordance with claim 9, wherein said fluid injector is configured to provide foreign gas to the component, wherein the foreign gas includes at least one of carbon dioxide or nitrogen.

11. The system in accordance with claim 9, wherein said sensing sheet comprises a layer of adhesive material, wherein said sensing sheet is coupled to the component with the adhesive material.

12. The system in accordance with claim 9 further comprising a tool, wherein said sensing sheet is coupled to said tool, and wherein said tool is configured to position said sensing sheet proximate to the component.

13. The system in accordance with claim 9, wherein said sensing sheet includes a plurality of apertures defined therein arranged in a predetermined pattern.

14. The system in accordance with claim 9, wherein the pressure-sensitive material is configured to change color based on a pressure of oxygen at the sensing sheet, wherein the fluid discharged from the plurality of flow openings at least partially restricts exposure of said sensing sheet to the oxygen.

15. A method of inspecting a component having a plurality of flow openings defined therein, said method comprising:
    positioning a tool proximate the component, wherein the tool has a sensing sheet coupled thereto, the sensing sheet formed at least partially from a pressure-sensitive material;
    emitting light towards the sensing sheet such that the pressure-sensitive material is excited to an energy level;
    providing fluid to the component such that the fluid is discharged from the plurality of flow openings and towards the sensing sheet; and
    determining a pressure distribution across the sensing sheet based on a flow profile of the fluid discharged from the plurality of flow openings, wherein the pressure-sensitive material is configured to change color as a function of a pressure of the fluid that flows across the sensing sheet.

16. The method in accordance with claim 15, wherein providing fluid to the component comprises providing a foreign gas to the component, wherein the foreign gas includes at least one of carbon dioxide or nitrogen.

17. The method in accordance with claim 16, wherein determining a pressure distribution comprises determining a color change in the pressure-sensitive material based on a pressure of oxygen at the sensing sheet, wherein the fluid discharged from the plurality of flow openings at least partially restricts exposure of the sensing sheet to the oxygen.

18. The method in accordance with claim 15 further comprising adhesively coupling the sensing sheet to the tool.

19. The method in accordance with claim 15, wherein positioning a tool comprises positioning the tool such that an area of the sensing sheet is spaced a substantially equal distance from a side wall of the component.

20. The method in accordance with claim 15, wherein the component includes a side wall oriented to define an interior configured to receive the fluid discharged from the plurality of flow openings, wherein positioning a tool comprises inserting the tool within the interior of the component.

* * * * *